United States Patent Office 3,816,506
Patented June 11, 1974

3,816,506
AMMOXIDATION OF SATURATED HYDROCARBONS
Keith M. Taylor, Ballwin, Mo., assignor to Monsanto Company, St. Louis, Mo.
No Drawing. Continuation-in-part of application Ser. No. 787,572, Dec. 27, 1968, which is a continuation-in-part of abandoned application Ser. No. 788,083, Dec. 30, 1968. This application Dec. 17, 1970, Ser. No. 99,299
Int. Cl. C07c *121/02*
U.S. Cl. 260—465.3      3 Claims

ABSTRACT OF THE DISCLOSURE

Acrylonitrile or methacrylonitrile are prepared in a vapor phase process which comprises reacting propane or isobutane, ammonia and oxygen in the presence of a catalyst consisting essentially of, as the essential catalytic ingredients, antimony and uranium and optionally a third element selected from the group consisting of nickel, vanadium and mixtures thereof, said elements being present in the form of oxides or of a complex with oxygen or mixtures thereof.

BACKGROUND OF THE INVENTION

This invention relates to the ammoxidation of saturated hydrocarbons to form unsaturated nitriles, particularly alpha, beta-ethylenically unsaturated mono-nitriles.

This application is a continuation-in-part of copending applications Ser. Nos. 787,572 filed Dec. 27, 1968 and 788,083 filed Dec. 30, 1968, now abandoned.

The value of alpha, beta-unsaturated nitriles is generally well recognized with acrylonitrile being among the most valuable monomers available to the polymer industry for producing useful polymeric products. Acrylonitrile is useful in the preparation of synthetic fibers, synthetic rubbers and other useful plastic products.

Many processes, catalytic and non-catalytic, are known and practiced for the manufacture of alpha, beta-unsaturated nitriles. A generally practiced catalytic ammoxidation process comprises reacting an olefin with ammonia and oxygen in the vapor phase in the presence of a catalyst. For the production of acrylonitrile, propylene is the generally used olefin reactant.

Propane is a source of carbon which is lower in cost than propylene or any other material useful as a starting material in the manufacture of acrylonitrile. Therefore, it is readily recognized that a feasible process for producing acrylonitrile directly from propane would be highly desirable.

Although some art has developed on the ammoxidation of propane to form acrylonitrile, a commercial feasible process has not heretofore been reported because the ultimate yield of acrylonitrile obtained from propane is relatively low. For example, U.S. Pat. No. 3,365,482 discloses the use of molybdenum oxide or tungsten oxide as catalysts for the conversion of propane to acrylonitrile. However, it is observed from this reference that the ultimate yield of acrylonitrile, based on propane converted, is low. As discussed in this patent and clearly recognized in the art, many catalysts are known which with comparative ease effect the ammoxidation of olefins to form alpha, beta-unsaturated nitriles; but that, unfortunately, saturated hydrocarbons do not have a reactivity comparable to unsaturated hydrocarbons to form alpha, beta-unsaturated nitriles.

SUMMARY

This invention is directed to a vapor phase process wherein at least one saturated hydrocarbon, ammonia and oxygen are contacted in the presence of a catalyst containing antimony and uranium and optionally a third element selected from the group consisting of nickel, vanadium and mixtures thereof under reaction conditions which produce unsaturated nitriles, particularly, at least in part, alpha, beta-ethylenically unsaturated mono-nitriles. Particularly, this invention is useful in converting propane to acrylonitrile and isobutane to methacrylonitrile.

Accordingly, typical objects of this invention are to provide: (1) an improved vapor phase process for the production of unsaturated nitriles, (2) a vapor phase ammoxidation process for converting saturated hydrocarbons directly to unsaturated nitriles, (3) vapor phase ammoxidation processes for the production of acrylonitrile directly from propane and methacrylonitrile directly from isobutane and, (4) a catalyst useful in the ammoxidation of saturated hydrocarbons.

Other objects, aspects and advantages of this invention will become apparent to those skilled in the art upon further study of this disclosure and the appended claims.

In accordance with this invention, in one aspect, unsaturated nitriles are prepared from saturated hydrocarbons in a one step vapor phase process comprising contacting at least one saturated hydrocarbon, ammonia and oxygen in the presence of a catalyst containing, as the essential catalytic ingredients, antimony and uranium and optionally a third element selected from the group consisting of nickel, vanadium and mixtures thereof under conditions suitable for converting the selected saturated hydrocarbon to the desired unsaturated nitrile.

Any saturated hydrocarbon capable of forming unsaturated nitriles may be used in the practice of the invention. The saturated hydrocarbons may contain 3 to 12 carbon atoms per molecule and may be straight chained or branched.

Basically, the applicable saturated hydrocarbons have up to 12 carbon atoms per molecule and may be represented by the formula:

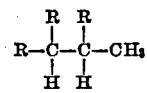

wherein R is hydrogen or a saturated monovalent organic hydrocarbon radical. Examples of useful saturated hydrocarbons are propane, butane, isobutane, pentane, isopentane, hexane, isohexane, 3-methyl pentane, dimethylpentane, 2,3-dimethyl butane, heptane, isoheptane, octane, isononane, dodecane, and the like.

One or more saturated hydrocarbons may be employed in the process at any one time. The saturated hydrocarbons employed should be substantially free of unsaturated hydrocarbons for best conversion and optimum yield of the desired unsaturated nitrile. The present invention is, therefore, not to be confused with the developed art directed to olefin ammoxidation processes which unanimously teach that saturated hydrocarbons in the olefin feed are inert to the reaction and apparently serve as a diluent.

While ammonia is most generally employed, other materials may be employed. For example, ammonia may be generated in use from decomposable ammonium compounds such as ammonium carbonate, or from various amines, such as methyl amine, ethyl amine and aniline. Any source of oxygen, pure or in admixture with inerts, may be employed in the process of this invention. Air is a satisfactory source of oxygen for use in this invention. The molar ratio of the saturated hydrocarbon:ammonia:oxygen employed in the process of this invention, will generally be in the range of 1:0.5:0.5 to 1:6:8 and preferably in the range of 1:1:1.5 to 1:3:4.

The catalyst used in the process of this invention may comprise (i) a mixture of the oxides of antimony and uranium and optionally oxides of nickel and/or vanadium and/or (ii) a compound or complex of oxygen, antimony and uranium with or without nickel and/or vanadium.

The antimony:uranium atomic ratio effective in the conversion of saturated hydrocarbons to alpha, beta-ethylenically unsaturated mono-nitriles can range from about 1:1 to about 99:1 and preferably from about 1:1 to about 20:1. The antimony:third element atomic ratio can range from about 1:1 to about 50:1 and preferably from about 5:1 to 25:1.

The catalyst can be employed with or without a support. When used with a support, preferably the support comprises 10 to 90% by weight of the catalyst. Any known support materials can be used, such as, for example, silica, alumina, zirconia, Alundum, silicon carbide, alumina-silica, pumice and the inorganic phosphates, silicates, aluminates, borates and carbonates, stable under the reaction conditions encountered in the process in which the catalyst is used.

The elements in combination with oxygen can be formed separately and then blended or formed separately or together in situ.

As starting materials for the antimony component, for example, there can be used any antimony oxide, such as antimony trioxide, antimony tetroxide and antimony pentoxide or mixtures thereof; or any antimony phosphate; or a hydrous antimony oxide, meta-antimonic acid, ortho-antimonic acid, or pyroantimonic acid; or a hydrolyzable or decomposable antimony salt, such as antimony halide, for example, antimony trichloride, trifluoride or tribromide; antimony pentachloride or antimony pentafluoride, which is hydrolyzable in water to form the hydrous oxide. Antimony metal can be employed with the hydrous oxide being formed by oxidizing the metal with an oxidizing acid such as nitric acid. The uranium component can be provided in the form of uranium oxide or by precipitation in situ from a soluble uranium salt such as the nitrate, acetate or a halide such as the chloride. Uranium metal can be used as a starting material, and if antimony metal is also employed, the antimony can be converted to the oxide and uranium to the nitrate simultaneously by oxidation in hot nitric acid. The vanadium component can be provided in the form of an oxide such as vanadium trioxide and vanadium pentoxide or in the form of a vanadium salt such as ammonium vanadate. The nickel component can be provide in the form of an oxide such as nickelous oxide and nickelic oxide or in the form of a salt such as nickel chloride.

Suitable antimony and uranium containing catalysts are described in U.S. Pat. No. 3,198,750 which disclosure is hereby incorporated herein by reference.

As previously stated, the process of this invention is carried out as a vapor phase reaction. Accordingly, any apparatus of the type suitable for carrying out oxidation reactions in the vapor phase may be employed for the practice of the process. The process may be operated continuously or intermittently, and may employ a fixed bed with a large particulate or pelleted catalyst, or a so-called "fluidized" bed of catalyst with finely divided catalyst. The latter type is presently preferred for use in the process of this invention as it permits closer control of the temperature of the reaction.

The process of this invention is carried out at a temperature in the range of about 300° C. and up to about 650° C. Preferably, the reaction is conducted at a temperature in the range of about 350 to about 550° C. When producing acrylonitrile from propane the temperature will generally be in the range of 450 to 600° C. and when producing methacrylonitrile from isobutane the temperature will generally be in ther ange of 350° C. to 500° C.

Pressures other than atmospheric may be employed in the process of this invention, however, it will generally be preferred to conduct the reaction at or near atmospheric pressure, since the reaction proceeds well at such pressure and the use of expensive high pressure equipment is avoided.

The contact time between the reactants and catalyst employed in the process of this invention may be selected from a broad operable range which may vary from about 0.1 to about 50 seconds. The contact time may be defined as the length of time in seconds which the unit volume of reactant gases measured under reaction conditions is in contact with the volume of catalyst employed. The optimum contact time will, of course, vary, depending upon the hydrocarbon being reacted, the catalyst and the reaction temperature. In the case of converting propane to acrylonitrile, the contact time will preferably be within the range of 0.5 to 15 seconds.

The reactor employed may be brought to the desired reactor temperature before or after the introduction of the vapors to be reacted. Preferably, the process is conducted in a continuous manner with the unreacted feed materials being recirculated. Also, the activity of the catalyst may be regenerated by contacting the catalyst with air at elevated temperatures.

The products of the reaction may be recovered from the effluent gas by any appropriate method and means known to the art and further elucidation here will be unnecessary duplication of the art.

DESCRIPTION OF PREFERRED EMBODIMENTS

The following Examples are given as illustrative of the invention and, as such, specifics presented therein are not intended to be unduly considered limitations upon the scope of this invention.

In the following Examples, the reactor used is a concentric tube system fabricated from 96% quartz tubing. The inner tube is ½" by 12" and the outer tube is 1" diameter. The reactor unit is supported in a vertical 1" tube furnace. Heat control of the reactor is accomplished by fluidizing Fisher "sea" sand in the shell side of the reactor unit. The reaction temperature given in the Examples are measured by a thermocouple in the center of the reactor. Prior to entering the reactor, the reactant gases are mixed in standard Swagelock stainless steel "T's" and introduced into the bottom of the reactor through a coarse quartz fritted tube. The effluent gases from the reactor are chromatographically analyzed.

EXAMPLE I

This Example illustrates the preparation of a catalyst consisting essentially of the oxides of antimony and uranium in an atomic ratio of Sb:U of 10:1.

A solution is prepared by dissolving 4 grams of uranyl acetate in 50 cc. of water. This solution is thoroughly mixed with 50 cc. of 30% silica sol. To this mixture is added 30 grams of antimony pentachloride dropwise while the mixture is being stirred. Finally, 50 cc. of ammonium hydroxide is stirred into the mixture. The mixture is evaporated to near dryness and then dried in a vacuum oven at 110° C. for 24 hours. The dried catalyst is then calcined under air at 800° C. for hours.

EXAMPLE II

This Example illustrates the preparation of a catalyst consisting essentially of the oxides of antimony and uranium in an atomic ratio of Sb:U of 5:1.

A solution is prepared by dissolving 8 grams of uranyl acetate in 80 cc. of water. This solution is thoroughly mixed with 50 cc. of 30% silica sol. To this mixture is added 30 grams of antimony pentachloride dropwise while the mixture is being stirred. Finally, 50 cc. of ammonium hydroxide is stirred into the mixture. The mixture is evaporated to near dryness and then dried in a vacuum oven at 110° C. for 24 hours. The dried catalyst is then calcined under air at 800° C. for 4 hours.

EXAMPLE III

This Example illustrates the utility of the catalysts as prepared in the preceding Examples for converting propane directly to acrylonitrile.

The feed to the reactor in each run consists of propane, ammonia and air. The volume ratio of propane:ammonia is 1:1.2 and propane:air is 1:12. The variables of reaction temperature, contact time and quantities of catalysts are shown in the following table which also gives the results of the raction.

TABLE

| Contact time (sec.) | Reactor Temp. (° C.) | Propane conversion (percent)[1] | Acrylonitrile (percent) | |
|---|---|---|---|---|
| | | | Single pass yield [2] | Ultimate yield [3] |
| Catalyst: 10Sb:1U, 3 grams | | | | |
| 1 | 500 | 3.4 | 2.4 | 70.6 |
| 5 | | 17.3 | 10.2 | 59.3 |
| 10 | | 25.4 | 13.5 | 53.0 |
| 1 | 550 | 9.6 | 6.2 | 64.8 |
| 5 | | 49.5 | 18.1 | 36.5 |
| 10 | | 71.1 | 8.2 | 11.5 |
| 1 | 600 | 38.7 | 8.5 | 22.0 |
| Catalyst: 5Sb:1U, 3 grams | | | | |
| 1 | 500 | 3.5 | 2.4 | 67.8 |
| 5 | | 14.9 | 8.2 | 54.9 |
| 10 | | 21.4 | 10.5 | 48.7 |
| 1 | 550 | 9.8 | 5.7 | 58.0 |
| 5 | | 51.9 | 17.0 | 32.7 |
| 10 | | 70.9 | 10.4 | 14.3 |
| 1 | 600 | 35.2 | 5.1 | 14.4 |

[1] Propane conversion (percent)
$$= \frac{\text{Mols propane in feed} - \text{mols propane in effluent}}{\text{Mols propane in feed}} \times 100$$

[2] Acrylonitrile Single pass yield (percent)
$$= \frac{\text{Mols acrylonitrile in effluent}}{\text{Mols effluent}} \times 100$$

Acrylonitrile ultimate yield (percent)
$$= \frac{\text{Acrylonitrile single pass yield (percent)}}{\text{Propane conversion (percent)}} \times 100$$

EXAMPLE IV

Example III is repeated except that isobutane is used instead of propane and the temperatures employed are 375° C., 425° C., 475° C. and 525° C. The catalyst used is a commercial acrylonitrile catalyst having a normal Sb:U atomic ratio of 5:1 and the contact times are 4, 8 and 16 seconds. Methacrylonitrile is obtained.

EXAMPLE V

This Example illustrates the preparation of a catalyst comprising antimony, uranium, and nickel in an atomic ratio of Sb:U:Ni of 5:1:0.5.

A solution is prepared by dissolving 8 grams of uranyl acetate in 80 cc. of water. To this solution is added 2.4 grams of nickel chloride. This solution is thoroughly mixed with 50 cc. of 30% silica sol. To this mixture is added 30 grams of antimony pentachloride dropwise while the mixture is being stirred. Finally, 60 cc. of ammonium hydrixed is stirred into the mixture. The mixture is evaporated to near dryness and then dried in a vacuum oven at 110° C. for 16 hours. The dried catalyst is then calcined under air at 800° C. for 4 hours.

EXAMPLE VI

This Example illustrates the preparation of a catalyst comprising antimony, uranium, and vanadium in an atomic ratio of Sb:U:V of 5:1:0.5.

A solution is prepared by dissolving 8 grams of uranyl acetate in 80 cc. of water. To this solution is added 1.2 grams of ammonium vanadate. This solution is thoroughly mixed with 50 cc. of 30% silica sol. To this mixture is added 30 grams of antimony pentachloride dropwise while the mixture is being stirred. Finally, 60 cc. of ammonium hydroxide is stirred into the mixture. The mixture is evaporated to near dryness and then dried in a vacuum oven at 110° C. for 16 hours. The dried catalyst is then calcined under air at 800° C. for 4 hours.

EXAMPLE VII

This Example illustrates the preparation of a catalyst comprising antimony, uranium, nickel and vanadium in an atomic ratio of Sb:U:Ni:V of 5:1:0.5:0.5.

A solution is prepared by dissolving 8 grams of uranyl acetate in 80 cc. of water. To this solution is added 2.4 grams of nickel chloride and then is added 1.2 grams of ammonium vanadate. This solution is thoroughly mixed with 50 cc. of 30% silica sol. To this mixture is added 30 grams of antimony pentachloride dropwise while the mixture is being stirred. Finally, 60 cc. of ammonium hydroxide is stirred into the mixture. The mixture is evaporated to near dryness and then dried in a vacuum oven at 110° C. for 18 hours. The dried catalyst is then calcined under air at 800° C. for 4 hours.

EXAMPLE VIII

This Example illustrates the preparation of three catalysts comprising antimony, uranium, nickel and vanadium in an atomic ratio of Sb:U:Ni:V of 5:1:0.5:0.5 containing sodium.

The catalysts are prepared by dissolving 8 grams of uranyl acetate in 80 cc. of water. To the solution is added 2.4 grams of nickel chloride and an amount of sodium chloride and then is added 1.2 grams of ammonium vanadate. The solution is thoroughly mixed with 50 cc. of 30% silica sol. To the mixture is added 30 grams of antimony pentachloride dropwise while the mixture is being stirred. Finally, the pH of the mixture is adjusted to 8 with ammonium hydroxide. The mixture is evaporated to near dryness and then dried in a vacuum oven at 110° C. for 16 hours. The dried catalyst is then calcined under air at 800° C. for 4 hours. The catalyst are hereinafter identified in regard to the quantity of sodium chloride employed as follows:

| Catalyst: | Mg. sodium chloride |
|---|---|
| Example VIII-1 | 20 |
| Example VIII-2 | 100 |
| Example VIII-3 | 1 |

EXAMPLE IX

This Example illustrates the preparation of a catalyst in accordance with the invention employing a variety of different supports.

A catalyst containing antimony, uranium, nickel and vandadium in an atomic ratio of 5:1:0.1:0.1, respectively, is prepared as follows:

A solution is prepared by dissolving 8 grams of uranyl acetate in 80 cc. of water. To this solution is added 0.5 grams of nickel chloride and then is added 0.2 grams of ammonium vanadate. This solution is thoroughly mixed with 50 cc. of 30% silica sol. To this mixture is added 30 grams of antimony pentachloride dropwise while the mixture is stirred. The mixture is then made alkaline with ammonium hydroxide. The mixture is evaporated to near dryness and then dried in a vauum oven at 110° C. for about 15 hours. The dried catalyst is then calcined under air at 800° C. for 4 hours. This catalyst is hereinafter referred to as catalyst Example IX-1.

The above catalyst preparation procedure is repeated several times using in each instance 15 grams of another catalyst support for the 30 cc. of 30% silica sol. These catalysts are hereinafter identified in regard to the particular support as follows:

Catalyst:
  Example IX-2 _____ Support
  Example IX-3 _____ Type V Celite.
  Example IX-4 _____ Chromosorb P.
  Example IX-5 _____ Silica gel.
  Example IX-6 _____ Alumina, Girdler T-1008.
           Pumice.

EXAMPLE X

This Example illustrates the preparation of catalysts in accordance with this invention comprising an antimony and uranium containing catalyst in physical admixture with a nickel and vanadium containing catalyst.

Part A

A catalyst containing nickel and vanadium is prepared as follows:

A solution is prepared by dissolving 1.7 grams of $NH_4VO_3$ and 4.3 grams of $Ni(NO_3)_2 \cdot 6H_2O$ in 100 cc. of water. To this solution is added 50 grams of a commercial acrylonitrile catalyst having a nominal antimony-uranium atomic ratio of 5:1. The mixture is evaporated to near dryness and then dried in a vacuum oven at 110° C. for 15 hours. Finally, the dried catalyst is calcined under air at 800° C. for 4 hours.

Part B

Another nickel, vanadium catalyst in admixture with a standard antimony-uranium catalyst is prepared as follows:

A solution is prepared by dissolving 25 grams of $NiCl_2 \cdot 6H_2O$ in 50 ml. of water. This solution is mixed with 150 cc. of 30% silica sol. To this mixture is added 6 grams of powdered $NH_4VO_3$ with stirring. To this mixture is added 40 cc. of glacial acetic acid with stirring. The mixture is evaporated to near dryness and then dried in a vacuum oven at 130° C. for 17 hours. The dried catalyst is calcined in air at 750° C. for 3 hours. Finally, 2.3 grams of this calcined nickel-vanadium catalyst is mixed with 3.3 grams of a commercial acrylonitrile catalyst having a nominal antimony:uranium atomic ratio of 5:1.

EXAMPLE XI

This Example illustrates the utility of the catalysts as prepared in the preceding Examples for converting propane directly to acrylonitrile.

The apparatus employed is as described previously. The reactants are propylene, ammonia and air. The volume ratio of propane:ammonia:air is 1:1.2:12, respectively. The temperatures, residence time and quantity of catalyst in the reactor, as well as data obtained from the tests are given in the following tabulation:

TABLE

| Contact time (sec.) | Reactor temp. (° C.) | Propane conversion (percent)[1] | Acrylonitrile (percent) Single pass yield [2] | Acrylonitrile (percent) Ultimate yield [3] |
|---|---|---|---|---|
| Catalyst: Example V—5Sb:1U:0.5Ni, 2.8 grams ||||| 
| 5.0 | 500 | 23.6 | 3.6 | 15.3 |
| 1.0 | 550 | 16.4 | 5.3 | 37.6 |
| 5.0 |  | 73.5 | 11.5 | 15.7 |
| Catalyst: Example VI—5Sb:1U:0.5V, 2.5 grams |||||
| 5.0 | 500 | 22.1 | 11.1 | 50.5 |
| 10.0 |  | 38.7 | 12.5 | 32.2 |
| 1.0 | 550 | 11.2 | 6.8 | 60.2 |
| 5.0 |  | 56.5 | 13.9 | 24.5 |
| Catalyst: Example VII—5Sb:1U:0.5Ni:0.5V, 2.8 grams |||||
| 1.0 | 500 | 10.0 | 6.3 | 63.5 |
| 5.0 |  | 36.8 | 9.8 | 26.5 |
| 10.0 |  | 42.5 | 8.4 | 19.8 |
| 1.0 | 550 | 23.5 | 4.6 | 19.5 |
| Catalyst: Example VIII-1—5Sb:1U:0.5Ni:0.5V, 2.8 grams |||||
| 1.0 | 500 | 8.6 | 5.5 | 63.7 |
| 5.0 |  | 30.6 | 11.5 | 37.0 |
| 10.0 |  | 44.1 | 12.7 | 28.9 |
| 1.0 | 550 | 19.2 | 8.3 | 43.5 |
| 5.0 |  | 61.7 | 12.1 | 19.5 |
| Catalyst: Example VIII-2—5Sb:1U:0.5Ni:0.5V, 2.5 grams |||||
| 5.0 | 500 | 27.6 | 10.1 | 36.6 |
| 10.0 |  | 43.0 | 11.6 | 26.9 |
| 1.0 | 550 | 12.3 | 6.3 | 51.2 |
| Catalyst: Example VIII-3—5Sb:1U:0.5Ni:0.5V, 2.9 grams |||||
| 5.0 | 500 | 31.4 | 6.0 | 19.2 |
| 10.0 |  | 41.2 | 7.5 | 18.3 |
| 1.0 | 550 | 16.5 | 5.8 | 35.0 |
| Catalyst: Example IX-1—5Sb:1U:0.1Ni:0.1V, 3.0 grams |||||
| 5.0 | 500 | 22.0 | 6.1 | 27.6 |
| 10.0 |  | 34.9 | 7.6 | 21.8 |
| 1.0 | 550 | 16.8 | 6.9 | 41.0 |
| 5.0 |  | 71.1 | 13.0 | 18.3 |
| Catalyst: Example IX-2—5SB:1U:0.1Ni:0.1V, 4.0 grams |||||
| 5.0 | 500 | 22.4 | 5.7 | 25.6 |
| 10.0 |  | 34.3 | 6.7 | 19.4 |
| 1.0 | 550 | 13.2 | 6.8 | 52.0 |
| 5.0 |  | 63.2 | 13.1 | 20.8 |
| Catalyst: Example IX-3—5Sb:1U:0.1Ni:0.1V, 3.5 grams |||||
| 1.0 | 550 | 14.8 | 5.2 | 35.0 |
| 5.0 |  | 61.2 | 10.4 | 17.1 |
| Catalyst: Example IX-4—5Sb:1U:0.1Ni:0.1V, 4.7 grams |||||
| 5.0 | 500 | 20.4 | 7.7 | 37.8 |
| 10.0 |  | 30.6 | 7.3 | 23.7 |
| 1.0 | 550 | 15.3 | 7.6 | 49.5 |
| 5.0 |  | 55.6 | 13.3 | 24.0 |
| Catalyst: Example IX-5—5Sb:1U:0.1Ni:0.1V, 6.7 grams |||||
| 1.0 | 500 | 25.1 | 4.7 | 18.2 |
| 1.0 | 550 | 35.6 | 8.1 | 22.8 |
| Catalyst: Exzmple IX-6—5Sb:1U:0.1Ni:0.1V, 4.4 grams |||||
| 1.0 | 550 | 15.3 | 3.7 | 24.5 |
| 5.0 |  | 56.0 | 9.6 | 17.1 |
| Catalyst: Example X—Part A, 7.3 grams |||||
| 0.3 | 500 | 10.0 | 5.2 | 52.0 |
| 1.0 |  | 23.5 | 9.5 | 39.4 |
| 5.0 |  | 43.0 | 15.6 | 36.2 |
| 10.0 |  | 52.8 | 14.7 | 27.8 |
| 1.0 | 550 | 24.2 | 9.2 | 38.0 |
| 5.0 |  | 47.4 | 12.7 | 24.7 |
| Catalyst: Example X—Part B, 5.6 grams |||||
| 5.0 | 500 | 17.5 | 8.9 | 51.1 |
| 10.0 |  | 36.4 | 14.2 | 39.0 |

[1] Propane conversion (percent) = $\dfrac{\text{mols propane in feed} - \text{mols propane in effluent}}{\text{Mols propane in feed}} \times 100$

[2] Acrylonitrile single pass yield (percent) = $\dfrac{\text{Mols acrylonitrile in effluent}}{\text{Mols effluent}} \times 10$

[3] Acrylonitrile ultimate yield (percent) = $\dfrac{\text{Acrylonitrile single pass yield (percent)}}{\text{Propane conversion (percent)}} \times 100$

EXAMPLE XII

Example XI is repeated except that isobutane is used instead of propane and the temperatures empolyed are 375° C., 425° C., 475 C. and 525° C. The catalyst used is that of Example X, Part B and the contact times are 4, 8 and 16 seconds. Methacrylonitrile is obtained.

The catalyst useful in this invention may be prepared by intimately mixing oxides of the selected elements or the hydrated oxide obtained by the action of aqueous nitric acid on the selected elements and heat treating the resulting mixture. The catalyst may be prepared by hydrolyzing with water cationic salts of the selected elements, such as the acetates, chlorides and the like, and recovering and heating the resulting precipitate.

It will be obvious to persons skilled in the art that various modifications may be made in the improved catlyst and process as described in this application. Accordingly, it is intended that all such modifications which reasonably fall within the scope of the appended claims are included herein.

I claim:

1. A process for the production of acrylonitrile which consists of reacting in the vapor phase at a temperature of from about 300° C. to about 650° C. a mixture of propane, ammonia and oxygen in a molar ratio of from about 1:0.5:0.5 to about 1:6:8, respectively, said mixture being substantially free of olefins, in the presence of a catalyst consisting of, as the active catalytic ingredients, (1) a mixture of the oxides of antimony and uranium and optionally oxides of nickel and/or vanadium and/or (2) a compound or complex of oxygen, antimony, uranium and optionally nickel and/or vanadium; and optionally, as a support, silica, the atomic ratio of antimony to uranium being from 1.1 to 99:1 and antimony to nickel and vanadium being from 1:1 to 50:1.

2. The process of claim 1 wherein only antimony, uranium and oxygen are present as the active catalytic ingredients in the catalyst.

3. The process of claim 1 wherein said molar ratio is from 1:1:1.5 to 1:3:4.

References Cited

UNITED STATES PATENTS

| | | | |
|---|---|---|---|
| 3,198,750 | 8/1965 | Callahan et al. | 260—465.3 X |
| 3,431,292 | 4/1969 | Callahan et al. | 260—465.3 |
| 3,365,482 | 1/1968 | Khoobiar | 260—465.3 |
| 3,433,823 | 3/1969 | McMahon | 260—465.3 |
| 3,627,817 | 12/1971 | Barnett et al. | 260—465.3 |

FOREIGN PATENTS

| | | | |
|---|---|---|---|
| 1,556,127 | 12/1968 | France | 260—465.3 |
| 711,964 | 9/1968 | Belgium | 260—465.3 |

JOSEPH PAUL BRUST, Primary Examiner